UNITED STATES PATENT OFFICE.

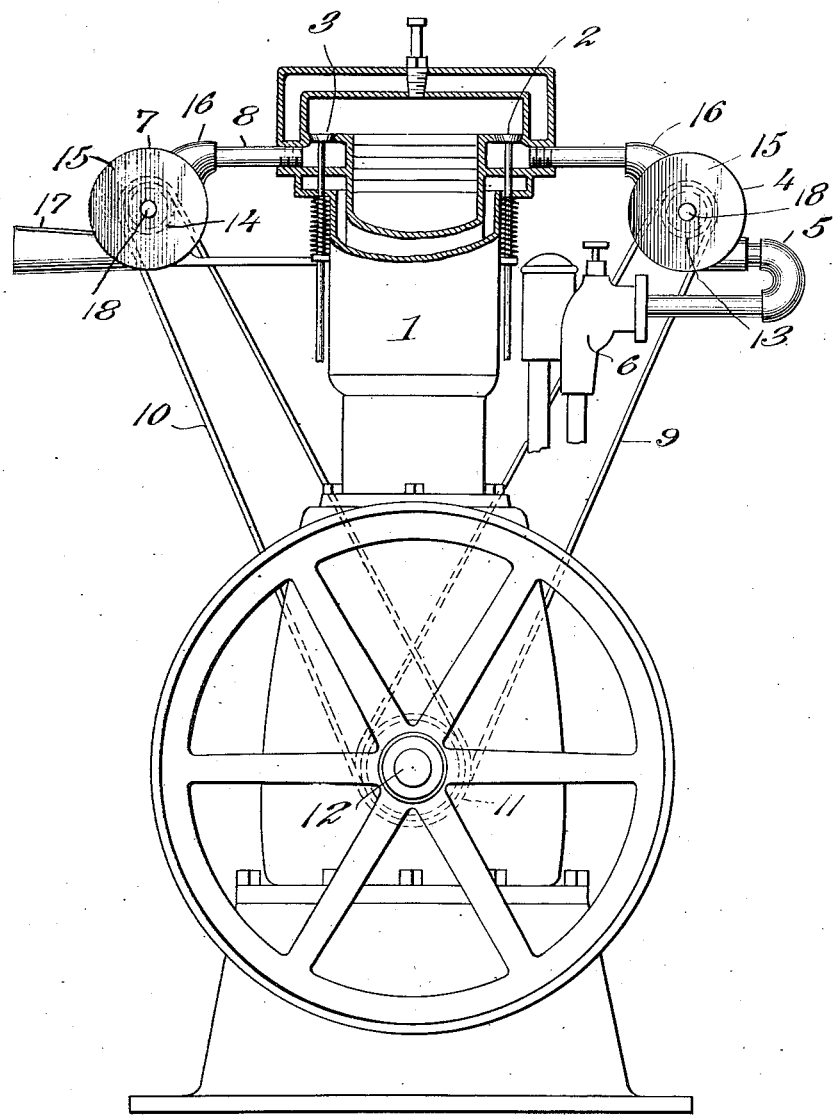

ERNEST FREDERICK SICKENBERGER, OF CARLSTADT, NEW JERSEY.

INTERNAL-COMBUSTION ENGINE.

937,653.  Specification of Letters Patent.  Patented Oct. 19, 1909.

Application filed July 1, 1908. Serial No. 441,330.

*To all whom it may concern:*

Be it known that I, ERNEST FREDERICK SICKENBERGER, a citizen of the United States, residing at Carlstadt, in the county of Bergen and State of New Jersey, have invented new and useful Improvements in Internal-Combustion Engines, of which the following is a specification.

This invention relates to internal combustion engines and has for its object to provide in connection with a four-cycle engine means for increasing the flexibility, power and speed of the engine and also the control of the engine whereby a full charge of compressed mixture is admitted to the explosion chamber of the engine at each active stroke enabling all speeds of the engine to be controlled by simply manipulating the throttle valve. The arrangement hereinafter described also provides for a prompt acceleration of the speed of the engine by means of the throttle independently of the usual spark leading ignition devices.

With the above and other objects in view, the invention consists in the novel construction, combination and arrangement of parts as herein fully described, illustrated and claimed.

In the accompanying drawings:—Figure 1 is an elevation of an internal combustion engine, partly in section, showing the invention applied thereto. Fig. 2 is a longitudinal section through one of the fans. Fig. 3 is a cross section through the fan.

Referring to the drawings, 1 designates the cylinder of an ordinary four-cycle internal combustion engine while 2 designates the intake valve and 3 the exhaust valves thereof.

In carrying out the present invention, a compression fan 4 is located in the intake pipe 5 leading from the carbureter 6 to the intake valve chamber 2, while exhaust fan 7 is arranged in the exhaust connection or pipe 8 leading from the exhaust valve chamber outward to the atmosphere. The fans 4 and 7 may be driven by belts 9 and 10 respectively, passing around pulleys 11 on the engine shaft 12 and around other pulleys 13 and 14 on the shafts of the fans 4 and 7 respectively.

Each of the fans 4 and 7 is preferably of the rotary type as best illustrated in Figs. 2 and 3, each fan comprising a substantially cylindrical fan casing 15 provided with tangentially disposed and oppositely arranged nozzles 16 and 17 while the fan itself comprises a rotary shaft 18 and a series of radially disposed blades 19 in the rotation of which the air or the mixture or exhaust gas is drawn in through one of the nozzles 16 or 17 and expelled through the other nozzle. It will also be observed that both fans are oppositely driven by the engine without the aid of any extraneous devices.

By means of the construction above described, it will be seen that a full charge of gas and air under compression is forced into the explosion chamber of the engine for each active stroke thereof, which is a particularly valuable feature when the engine is running at high speed as it gives increased power to the engine as compared with the engine now in common use in which, as is well known, only a partial charge is admitted to the cylinder. This increases the flexibility, power and speed of the engine and enables the same to be quickly controlled by means of the throttle, although, it is, of course, to be understood that the usual spark advancing and retarding mechanism may also be used in connection with the engine.

I claim:—

The combination with a gas engine, of rotary fans comprising cylindrical fan casings having inlet and outlet connections in the cylindrical walls thereof, said casings being interposed in the intake and exhaust lines of piping connecting with the engine, fans mounted in said casings, and driving wheels on the fan shafts receiving driving belts from a rotary element of the engine.

In testimony whereof I affix my signature in presence of two witnesses.

ERNEST FREDERICK SICKENBERGER.

Witnesses:
E. H. OTTO,
A. ZUMETA.